Dec. 18, 1962
W. O. BENJAMIN
3,068,754
PRISMATIC LIGHT TRANSMITTING PANEL
Filed July 30, 1958
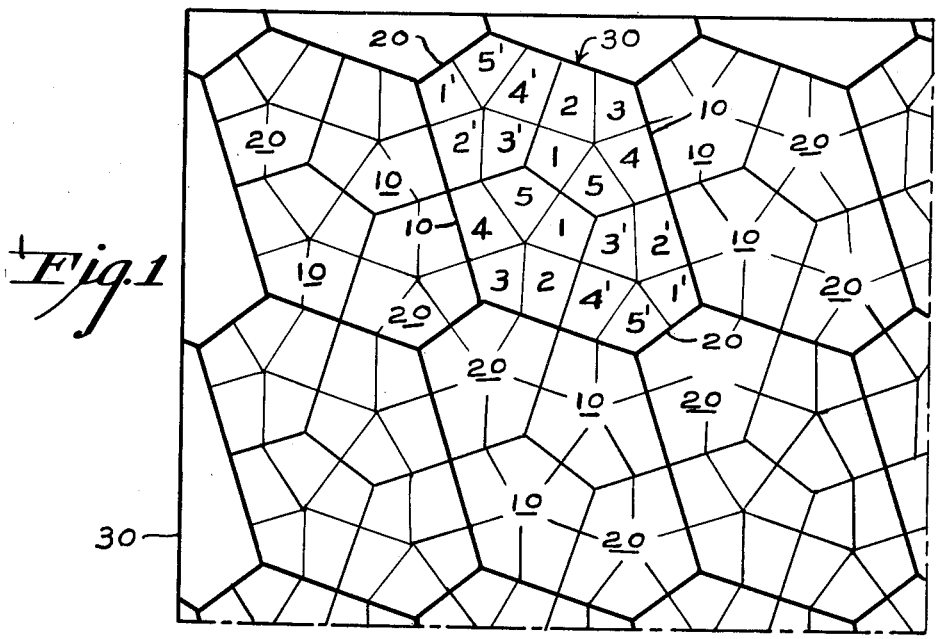
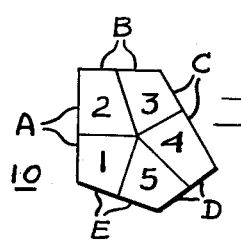
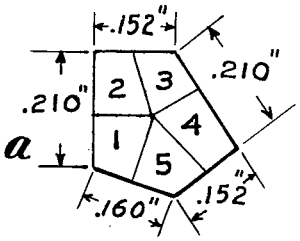
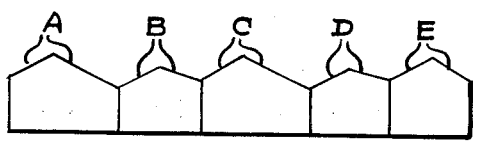
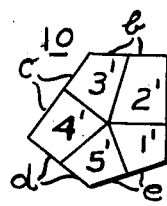
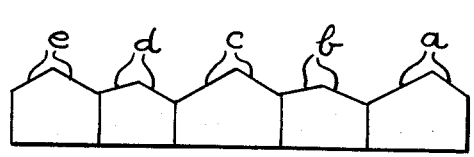
INVENTOR.
WARREN O. BENJAMIN
BY Clarence R. Patty
ATTORNEY

United States Patent Office 3,068,754
Patented Dec. 18, 1962

3,068,754
PRISMATIC LIGHT TRANSMITTING PANEL
Warren O. Benjamin, Corning, N.Y., assignor to Corning Glass Works, Corning, N.Y., a corporation of New York
Filed July 30, 1958, Ser. No. 751,922
7 Claims. (Cl. 88—57.5)

The present invention relates to certain improvements in means for transmitting, refracting and diffusing light rays, more particularly when employed in connection with the illumination of large rooms from light sources usually, but not necessarily, recessed into ceilings of such rooms.

Many prismatic light transmitting systems have been devised in the past for use in the above or a similar fashion, but one of their common faults is that the prismatic panels employed, when viewed from remote areas, and particularly when viewed from certain regions of such areas, confront the viewer with streaks of undiffused blinding light rays. By way of example, in some instances the light issuing surfaces of the prisms thereof comprise parallel ribs. When such a prismatic surface is observed from areas normal to the ribs an adequate amount of diffusion is afforded to shield the viewer from objectionable light glare. However, if this same surface is viewed from a remote area generally coextensive with the ribs, the substantial direct light escaping will direct a glare of objectionable blinding light rays to the observer.

According to the present invention, the light emitting surfaces of the panels are composed of the side surfaces of a cluster of tightly packed prisms comprising pyramids of such form and arrangement that oppositely disposed sides of adjacent pyramids are in each instance in oblique radial planes with respect to the pyramid sides they face, so that light emitted from any side of a pyramid and intercepted by a surface of an adjoining pyramid has its course radially altered. Also, the extent of obliqueness is greatly varied by the use of two forms of polygonal pyramids whose respective faces vary in their radial position with respect to the oppositely disposed faces of the respective adjoining pyramids. Moreover, the outlines of the bases of the respective pyramids are such that the pyramids may be tightly packed over the entire lens area and there is such an interlocking or overlapping pattern produced thereby that, irrespective of the direction from which the panel is viewed, a fully diffused pattern of light, substantially free from glare, is observed.

For a more complete disclosure of the invention, reference is made to the following specification, taken in connection with the accompanying drawing in which:

FIG. 1 is a bottom plan view on an enlarged scale of a fragment of a pyramidal prismatic surfaced panel embodying the invention.

FIG. 2 is a similar bottom plan view of a pyramidal structure such as repeatedly used in the panel shown in FIG. 1.

FIG. 2a is similar to FIG. 2 but shows typical dimensions omitted from FIG. 2.

FIG. 3 is a side elevational view of the structure shown in FIG. 2.

FIG. 4 is a view showing the five vertical side walls only, of the structure shown in FIGS. 2 and 2a.

FIGS. 5 through 7 are views of a pyramidal structure of the same size and outline as that of FIGS. 2, 3 and 4, but having a different facial configuration.

Referring to the drawing in detail, wherein like parts are given like designations, it will be observed that each of the two forms of pyramids 10 and 20, respectively embodied in the panel 30 has five faces such as 1 to 5 and 1' to 5', respectively and a five sided base outline such as A through E and a through e, respectively.

Moreover, it will be observed from a comparison of FIGS. 2 and 5 that the base outlines of prisms 10 and 20 are of the same dimension and are similarly asymmetrical. It will also be observed from a comparison of FIGS. 4 and 7 that the base outlines A through E of a prism 10 are identical to the base outlines a through e of a prism 20.

Referring now to FIG. 1, it will be observed that two prisms such as 10 and two prisms such as 20 are tightly packed to form a cluster thereof having the outline of a hexagon such as 30 emphasized in the drawing by a heavy border outline and which, as shown, comprises one of a number of closely packed clusters thereof depending on the lens dimensions. Moreover, it will be observed that not only do the lines of juncture of the pyramids of a cluster follow zigzag courses, but so also do the lines of juncture between the respective clusters. Accordingly, the panel as a whole presents a mottled and/or uniformly diffused light pattern to an observer irrespective of the direction from which the light emitting surface of the prisms is viewed.

As will be understood, the several dimensions of the pyramids and the slope of their faces is a matter of choice. The pyramid 10 as illustrated in FIG. 3 is shown as having its faces sloping at 28° with the shortest dimension between the lateral extremities of its base lines being indicated in FIG. 2a as .110, .210, .160, .152 and .210 inch, respectively. As will be appreciated therefore and as clearly illustrated in FIGS. 4 and 7 the base outlines of each pyramid varies in height in accordance with its distance from its apex.

As will be further understood, although in the illustrative example of the invention, as shown and described, five sided pyramids have been employed, panels embodying pyramids having fewer or more sides may be employed without departing from the spirit or scope of the invention.

What is claimed is:

1. A light-transmitting panel having a surface comprising a cluster of pyramids, each of said pyramids comprising three sloping plane faces, each of said faces intersecting two adjacent faces in two straight lines meeting at an apex, each of said faces differing in shape from at least one other of said faces, and each of said pyramids differing in shape from at least one other of said pyramids.

2. A panel as defined by claim 1 wherein different of the faces of the pyramid are of different quadrangular outline.

3. A panel as defined by claim 1 wherein the slope of all sides of the pyramid is the same.

4. A panel as defined by claim 1 wherein the boundary line of the base is divided into a plurality of sections each occupying a plane whose intersection with a plane normal to the lens face is inclined to the panel face.

5. A prismatic light transmitting panel embodying a cluster of adjoining pyramids each of whose inclined faces all meet at a common point, each of whose faces is of irregular quadrangular outline and the outline of each face of any pyramid of the cluster is different from that of any other face of such pyramid.

6. A light-transmitting panel having a surface comprising a plurality of clusters of pyramids, each of said clusters composed of four pyramids, two of said pyramids being identical in shape but differing from the other two, which other two are identical to each other, each of said pyramids comprising a base and five sloping plane faces each having four sides, each of said faces intersecting two adjacent faces in two straight lines forming two sides of said faces and meeting at an apex, each of said faces being different in shape from at least one other of said faces, each of said pyramids intersecting five adjacent pyramids to form respectively five straight lines, each of said five straight lines consisting of one of each of the two remaining sides of said faces and each of said clusters being hexagonal in shape.

7. A panel as defined by claim 6 wherein the bases of the pyramids are of pentagonal outline and the six sided outline of each cluster embodies two oppositely disposed short lines, two oppositely disposed lines of substantially double the length of said short lines and two oppositely disposed lines of more than twice the length of such short lines.

References Cited in the file of this patent

UNITED STATES PATENTS

| | | |
|---|---|---|
| 385,270 | Jacobs | June 26, 1888 |
| 402,073 | Falconnier | Apr. 23, 1889 |
| 456,046 | Mark | July 14, 1891 |
| 1,097,349 | Mygatt | May 19, 1914 |
| 2,086,185 | Keaney | July 6, 1937 |
| 2,380,447 | Jungersen | July 31, 1945 |
| 2,780,136 | Erban | Feb. 5, 1957 |